Jan. 4, 1927.  1,613,378
C. BONIFORTI
CUT FILM MAGAZINE
Filed July 10, 1925    2 Sheets-Sheet 1
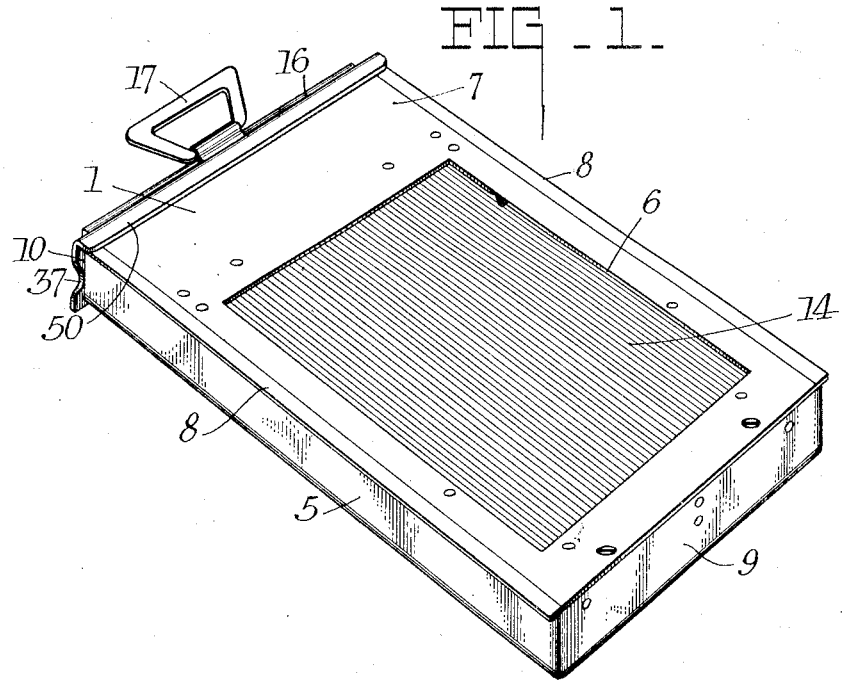
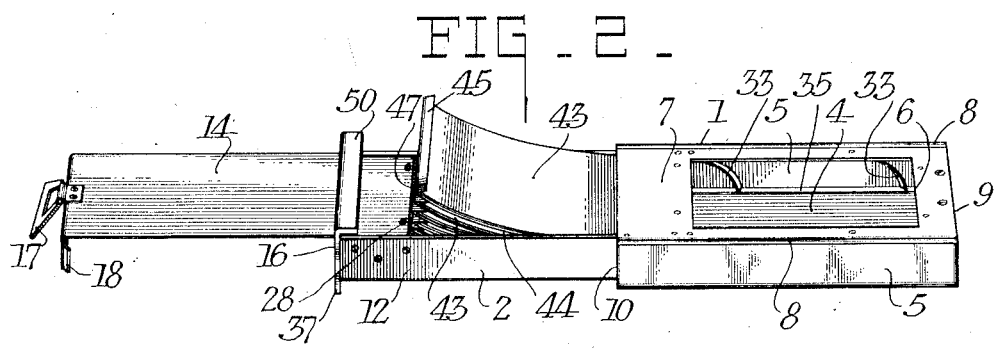
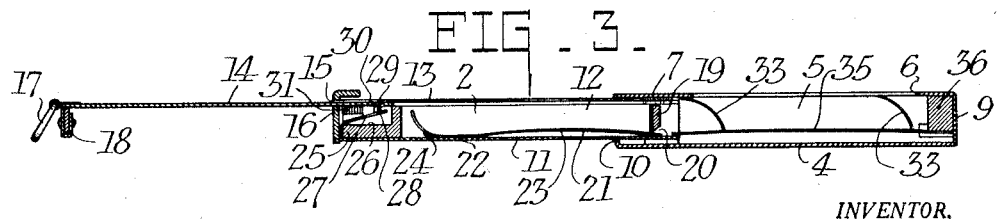
INVENTOR,
Carlo Boniforti,
BY R. L. Stinchfield
N. M. Perrins
ATTORNEYS.

Jan. 4, 1927. 1,613,378
C. BONIFORTI
CUT FILM MAGAZINE
Filed July 10, 1925   2 Sheets-Sheet 2
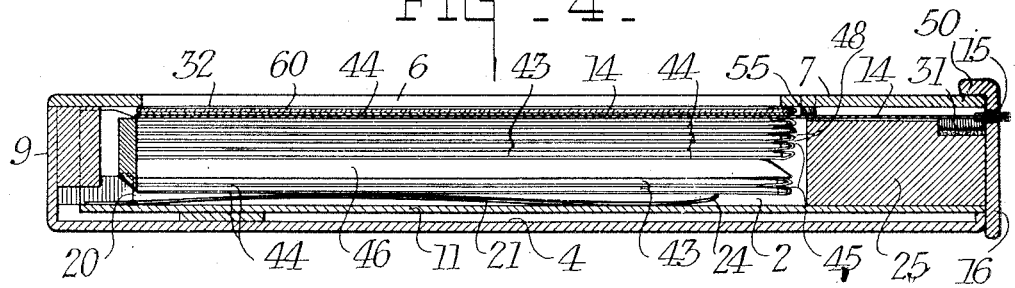
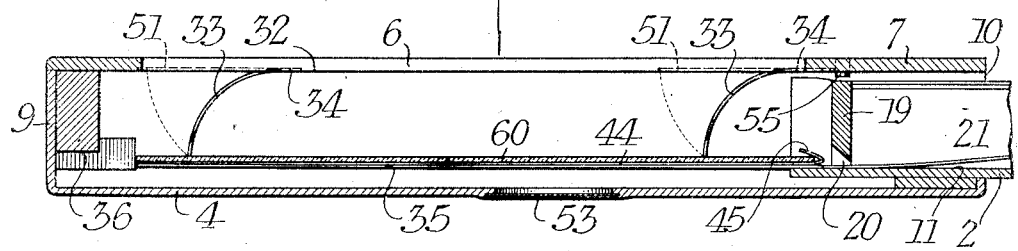
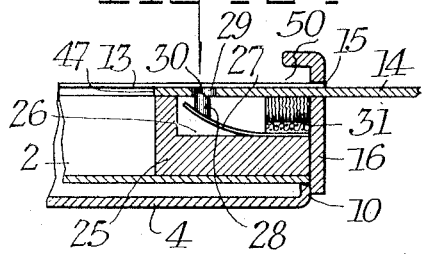
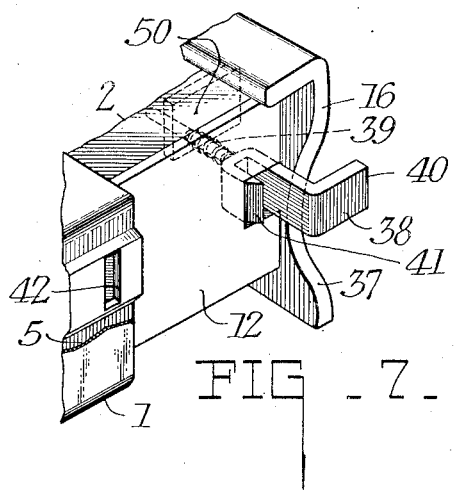
Carlo Boniforti,
INVENTOR,
BY
ATTORNEYS.

Patented Jan. 4, 1927.

1,613,378

UNITED STATES PATENT OFFICE.

CARLO BONIFORTI, OF MILAN, ITALY.

CUT-FILM MAGAZINE.

Application filed July 10, 1925, Serial No. 42,713, and in Italy July 30, 1924.

My invention relates to magazines for sensitized cut films and particularly to magazines of the type containing a stack of such films, which are successively exposed, the front or exposed film being moved to a position at the back of the stack.

The stack of films which I use is disclosed in my copending application, Serial No. 42,714, filed July 10, 1925, and cooperates particularly well with the magazine herein disclosed. My present invention consists of the combination of this improved pack with the magazine designed therefor and also in certain improvements in the magazine whereby it functions easily and quickly to transfer the films from one position to another all as will appear in the following specification and claims.

Reference will now be made to the accompanying drawings in all the figures of which the same reference characters indicate the same parts—

Fig. 1 is a perspective view of my improved magazine, in closed condition;

Fig. 2 is a perspective view thereof in fully open position;

Fig. 3 is a section thereof, fully opened;

Fig. 4 is a section thereof, closed including edge views of the films and sheaths;

Fig. 5 is a section of a part showing a position of a film during changing;

Fig. 6 is a section of a detail;

Fig. 7 is a perspective view of a detail;

Fig. 8 illustrates a position of the septum with reference to the film.

The magazine comprises three main parts, an outer casing 1, a drawer member 2 telescoping into the outer casing and a septum 14.

The casing 1 has a back or bottom 4 and sides 5 and an exposure aperture 6 of the desired size in its top or front wall 7. The front wall is extended, as shown at 8, along the sides of the casing to afford means by which the magazine may engage suitable slideways on a camera. One end 9 is closed and the other is open at 10 so that the drawer member may slide in and out.

The drawer member 2 has a closed bottom 11 and sides 12, and is open at the top with narrow flanges or guideways 13, in which slides a septum 14, extending out through a slot 15 in one end 16 of the drawer member and having a manipulating handle 17 and an abutment flange 18. The guideways 13 extend beyond a cross bar 19 near the other end of member 2. The lower edge of cross bar 19 is beveled and between it and the bottom 11 is a slot 20 through which extends one end of a sheet metal spring 21 which occupies the central part of the drawer 2 and is attached toward one end to the bottom 11 at 22. The main portion of this sheet tends to bow upwardly as at 23 while the end 24 beyond the point of attachment also tends to spring out. At the end 16 is a block 25 having cavities 26 in which are springs 27 with projections 28 pressed outwardly and adapted to snap into apertures 29 near the end of septum 14, preventing its complete withdrawal from the drawer. Projections 28 are beveled at 30 so that the septum may be readily pushed back into the drawer. A light seal 31 is provided near slot 15.

Underneath flanges 32 extending along the sides of aperture 6 in casing 1 are sheet metal spring members 33 which are secured to the casing at 34 and tend to bow into the casing opposite the resilient sheet metal guide members 35, secured to a block 36, in one end of the casing and free at the other end, overlying the bottom 11 of the drawer.

The end 16 of drawer member 2 is extended to form a flange overlapping the end of casing 1, when seated, and extended at the sides to form finger pieces 37, opposite one of which is a latch member 38 normally pressed outward by spring 39 and having a finger tab 40 and a beveled latch 41 adapted to engage slot 42 in the side 5 of casing 1. An abutment 50 extends down from the front 7 of casing 1 closing a space above the guideways for the septum wherein a film may be positioned.

The cut films 43 intended for use in this magazine are each placed in a sheath consisting of a piece of backing paper 44 bent over at one end at 45. The natural resilience of these bent over flanges tend to separate the films and to expand the pack of films as described in my copending application, causing small wedge like openings 48 to be formed between them. Included in the pack is usually a dummy member 46 forming the bottom of the pack.

In practice, the magazine members are fully extended, opening up the drawer member, and a pack of films with their sheaths is placed therein with the flanges 45 of paper uppermost and toward the outer end of the drawer, as shown in Fig. 2.

They are depressed or forced together so that septum 14 can be passed over them into closed position. This operation must be performed in a darkroom.

The drawer 2 is then closed, rendering the magazine light tight. It is then attached to a suitable camera, and the septum withdrawn again until its inner end 47 passes the flanges 45. The expansive tendency of the flanges then forces the top film and sheath 60 up until they contact the walls around exposure aperture 6 and behind abutment 50. The septum and films occupy the relative position shown in Fig. 8. The septum is then pushed in again engaging the top recess 48 and passes beneath the top film sheath 60, forcing it and its film tightly against the wall around the exposure opening, as shown in Fig. 4. The septum forms a back presser member holding the film very exactly in a plane and overcoming the tendency to buckle that is frequently present in film packs and cut film magazines.

After exposure in a camera, the magazine as a whole being still on the camera, the drawer 2 with the septum in closed position is pulled out. The top sheath 60 is held against movement by pins 55 of the abutment 50, and as the other films and the septum are withdrawn, springs 33, which had been forced upward into recesses 51 by the cam action of the walls of the drawer, are released and force the remaining film sheath 60 against guide members 35, the ends of the springs describing the path indicated in dotted lines in Fig. 5. The drawer member is then again pushed home and the beveled edge of slot 20 causes the sheath 60 with its film to pass through it and enter between the spring 21 and the bottom of the pack. When the drawer is entirely closed, the magazine is again in its original position with the septum outermost and the magazine light tight so that it can be removed from the camera.

The series of exposures is thus made one after the other, the complete cycle for each exposure comprising the withdrawal and return of the septum alone, and the withdrawal and return of the drawer member. Each sheath and the dummy has a number or other symbol on its back which may be observed through the red window 53 in the back 4 of the casing.

It is to be noted that springs 33 are outside of the exposure area and the resilient guides 35 are arranged on each side of the casing, while the spring 21 is central of the casing and slides in between the guide members 35 when the parts are telescoped, affording a ready and unobstructed path for the film sheath as it is introduced into the bottom of the drawer beneath the pack. The natural resilience of the spring members with that of the film sheaths permits these to yield as the advancing end of the film sheath is thrust beneath the pack.

When in the specification and claims, parts are mentioned as upper, lower, top, bottom, or by other words descriptive of relative position, it is to be understood that these expressions are used for ease of description and not as limiting the magazine to any definite position when in use. It would normally be placed with the exposure opening upwardly when being loaded; but when in a camera this would usually be vertical. The device will operate to shift the films, whatever its position, since it is in no way dependent upon gravity in its operation.

It is to be further understood that I contemplate as included within my invention all such modifications and equivalents as fall within the scope of the appended claims.

Having thus described my invention, what I claim as new and desire to secure by Letters Patent is:

1. A magazine for cut films comprising an outer casing with an upper exposure opening and an open end, an open drawer member telescoping in said casing through said open end and a septum slidable in said drawer member to open and close it, springs in the casing on each side of the exposure openings and in the path of movement of the drawer and normally exerting a downward tension, and movable by the drawer to a retracted position when the drawer is closed.

2. A magazine for cut films comprising an outer casing with an upper exposure opening and an open end, an open drawer member telescoping in said casing through said open end and a septum slidable in said drawer member to open and close it, said casing having recesses in its upper part on opposite sides of the exposure opening, leaf springs secured at one end in the recesses and tending to extend into the path of movement of the drawer member and being automatically retracted into said recesses by the drawer member when the latter is moved into closed position in the casing.

3. A magazine for cut films comprising an outer casing with an upper exposure opening and an open end, an open drawer member telescoping in said casing through said open end and a septum slidable in said drawer member to open and close it, a leaf spring in the central part of the bottom of the drawer member adapted to press a contained pack of film upwardly, leaf springs in the casing on each side of the exposure opening in the path of movement of the drawer member, the walls of the casing having recesses into which said second named springs are retracted when the drawer is inserted, and spring guide members near the bottom of the casing and on the sides thereof opposite the second named spring, the last named spring members lying upon opposite sides of said first named spring member when the parts are in closed position.

4. A magazine for cut film comprising an outer casing with an upper exposure opening and an open end, an open drawer member telescoping in said casing through said open end and a septum slidable in said drawer to open and close the same, guide springs within and attached to the casing at the sides thereof, and a guide spring in the central part of the drawer and attached to the bottom thereof, the bottom of the drawer being adapted to slide beneath said side guide springs and the central spring being positioned between the said side guide springs as the drawer is moved to closed position within said casing.

5. In combination, a pack of cut films, and a magazine therefor having a movable septum adapted to be moved between successive films of said pack, there being in the pack and at least in part between the films means tending to separate the films, whereby the septum may be more easily moved between said films.

6. In combination, a pack of cut films and a magazine therefor having a movable septum adapted to be moved between successive films of said pack, said pack comprising a plurality of cut film sheets and a plurality of sheets separating said film sheets, said separating sheets being formed of material having a natural resilience and having a part thereof formed to constitute expansive members tending to separate the sheets whereby the septum may be more readily moved between them.

7. In combination, a magazine for cut films comprising an outer casing with an exposure opening and an open end, an open drawer member telescoping in said casing through said open end and a septum slidable in the free end of said drawer to open and close the drawer, and a pack of cut films and sheaths therefor, each sheath comprising a sheet of flexible material in back of the corresponding film and having a flange embracing one end of the film, said flanges having a naturally expansive force, said pack of films being positioned in the drawer member with the flanges directed toward the free end thereof, whereby when the magazine is closed the pack will tend to fill the magazine, and when the septum is withdrawn the top sheath will be advanced to permit the septum to be pushed beneath it; the septum when thus positioned beneath it constituting a flat presser member holding the flexible sheath and film firmly in a plane beneath the exposure opening.

8. In combination, a magazine for cut films comprising an outer casing with an exposure opening and an open end, an open drawer member telescoping in said casing through said open end and a septum slidable in the free end of said drawer to open and close the drawer, and a pack of cut films and sheaths therefor, each sheath comprising a sheet of flexible material in back of the corresponding film and having a flange embracing on end of the film, said flanges having a naturally expansive face, said pack of films and sheaths being positioned in the drawer with their flanges directed toward the free end thereof, and the casing and drawer having a guideway for the septum with a space for a film above it, whereby when the magazine is closed the pack will tend to fill the magazine and when the septum is withdrawn the top sheath will be advanced into the space and the septum may be returned beneath it.

CARLO BONIFORTI.